Figure 1:
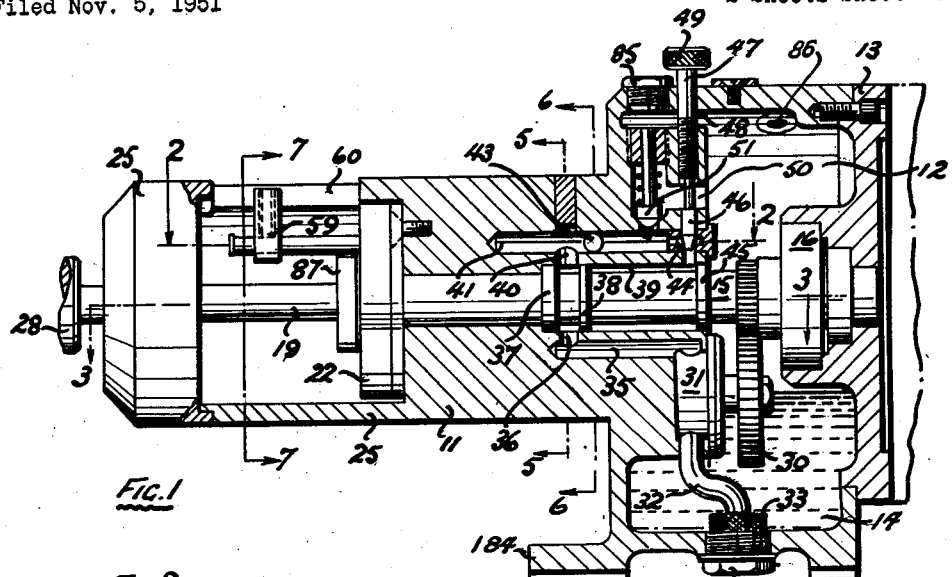

April 7, 1953  H. DALES  2,633,709

MACHINE TOOL

Filed Nov. 5, 1951  2 Sheets-Sheet 1

INVENTOR
HERBERT DALES
By Mawhinney & Mawhinney
ATTYS.

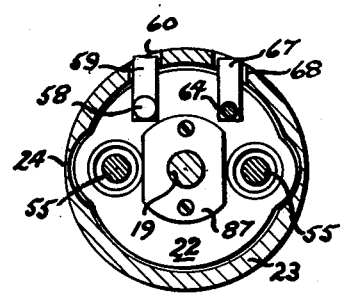
Fig. 7
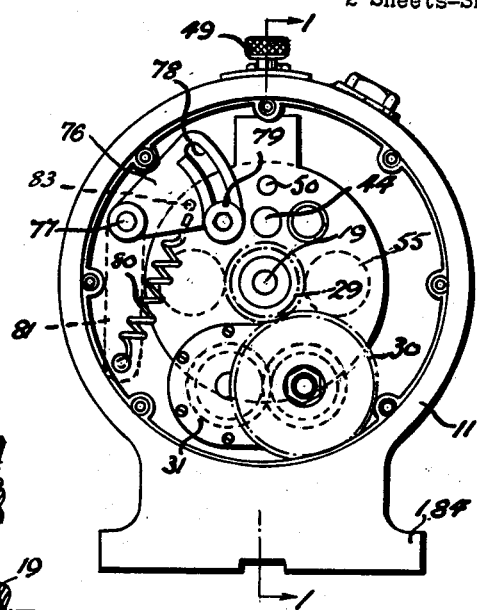
Fig. 4
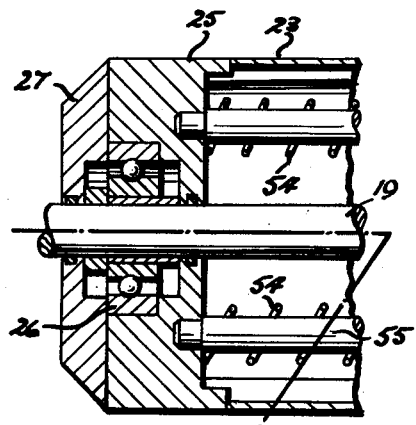
Fig. 3
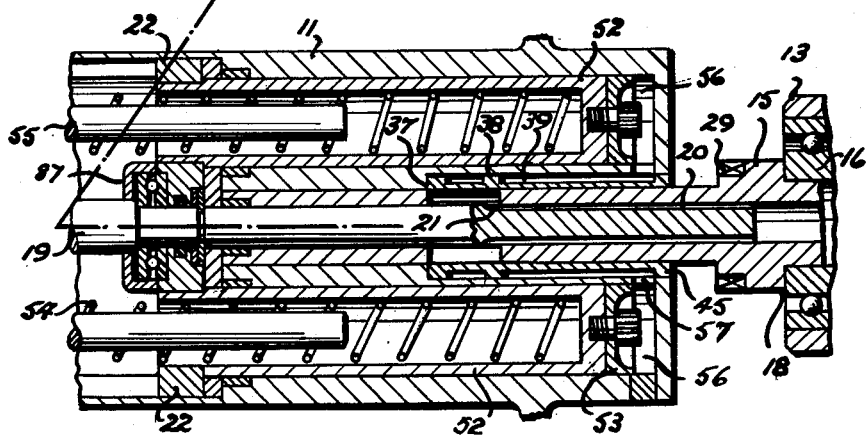
INVENTOR
HERBERT DALES
By Mawhinney & Mawhinney
ATTYS.

Patented Apr. 7, 1953

2,633,709

UNITED STATES PATENT OFFICE 2,633,709

MACHINE TOOL

Herbert Dales, Leamington Spa, England

Application November 5, 1951, Serial No. 254,935
In Great Britain September 13, 1950

5 Claims. (Cl. 60—52)

The invention relates to a machine tool of the kind in which an axially movable tool-carrying end of a driven tool spindle is, in an automatically operated cycle, first advanced to a position for operating on a work-piece, is then fed further but at a reduced axial speed for operating on the work-piece, is allowed to dwell at the end of the feed movement and is finally returned to its initial position in readiness for another cycle.

The object of the invention is to provide a small, self-contained machine tool of this kind which will be relatively inexpensive to produce and efficient in operation.

According to the invention the machine tool includes a hydraulic pump, and an electric motor which is connected for driving it and the tool spindle, the pump being for delivering its output to a hydraulic cylinder for displacing a coacting hydraulic piston in one direction against a bias, and the piston being connected to the tool-carrying end of the spindle for moving it in sympathy, there being a valve means which is actuated, by a part moving with the piston when the latter is at an intermediate point in its travel in the said one direction, for diverting a proportion of the pump delivery from the hydraulic cylinder, whereby to provide the feed at reduced axial speed for the said tool-carrying end, there also being a second valve means actuated by a part moving with the piston, which second valve means, when the hydraulic piston reaches the end of its travel in the said one direction, enables a time-delay means to be actuated for connecting the hydraulic cylinder to exhaust and for diverting the remainder of the pump delivery from the hydraulic cylinder, whereby, after a dwell provided by the time delay, the piston is returned by its biassing means and restores the two valve means to their initial positions, and there also being a detent means which operates releasably to maintain the piston in its said initial position.

In this way, when the electric motor is running and the machine tool is being used, for example, as a drilling unit, the cycle of operations is initiated by releasing the detent means, and this causes the pump delivery (which, while the detent means was operating, was being diverted to the pump intake) to move the hydraulic piston firstly to advance the drill up to a work-piece at an axial speed which is greater than that desirable for the drilling operation, and then to feed the drill at an appropriate axial speed into the work-piece. The drill is then allowed to dwell at the end of its feed movement, for properly clearing the bottom of the bore, whereafter it is withdrawn and re-set by the detent means in readiness for the next drilling operation.

Conveniently the tool spindle is formed in two relatively non-rotatable parts of which one is axially located and receives the drive from the electric motor, the other part of the tool spindle being axially slidable with relation to the first (e. g., by means of a splined connection) and having provision (e. g., a chuck) at its outer end for carrying the tool to be used for the particular operation, the axially slidable part of the spindle being journalled with axial location in a crosshead which is fast with the hydraulic piston for moving the drill, or other tool axially in sympathy with the latter.

According to a further feature of the invention two or more of the machine tools are suitably arranged to perform different operations on a work-piece in sequence, and at least one of the machine tools, when its operation is completed and its tool spindle is returned to its initial position, being connected to release the detent means of another of the machine tools to automatically initiate a further one of the operations on the work-piece. In this way, as each machine tool completes its own operation, it sets in motion a neighbouring machine tool for performing another operation on the work-piece.

Figure 2:
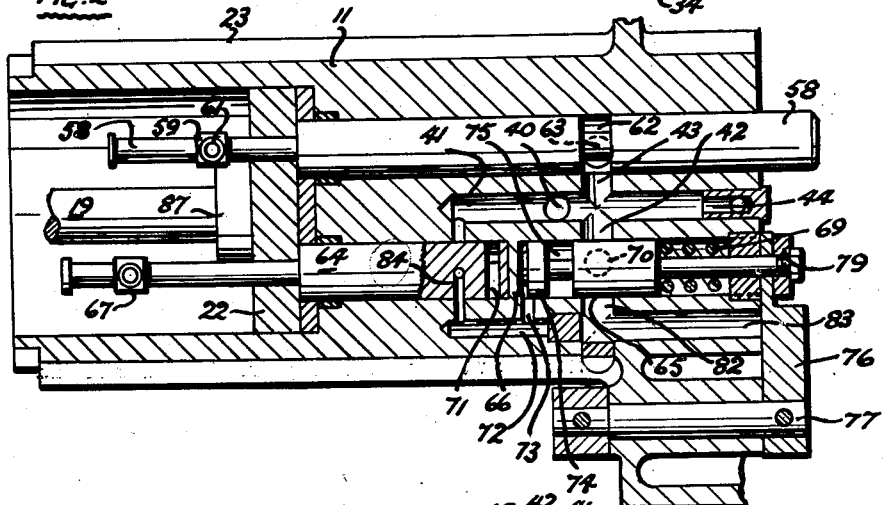
Figure 5:
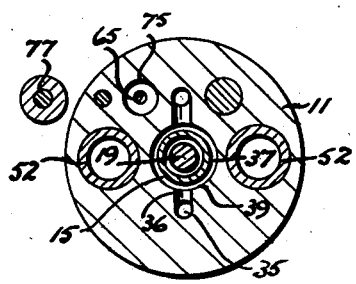
Figure 6:
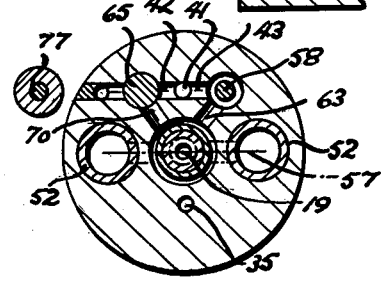

In the accompanying drawings:

Figure 1 is a section, on the line 1—1 of Figure 4, through one form of hydraulic drilling unit according to the invention;

Figures 2 and 3 are sections respectively on the lines 2—2 and 3—3 of Figure 1 but omitting some of the parts of the unit;

Figure 4 is an end view from the right of Figure 1, but with an adjacent end plate and bearing removed; and Figures 5, 6 and 7 are, respectively, sections on the lines 5—5, 6—6 and 7—7 of Figure 1.

Referring to the drawings, the unit includes a body 11 which, at the right of Figure 1, is formed as a well 12 with a cover plate 13 to provide a reservoir for hydraulic fluid, which latter is indicated at 14. The plate 13 shown, is an end plate of an electric motor (not shown) having its output shaft (also not shown) splined within a sleeve 15 which is rotatively supported in a bearing 16 fast with the plate 13 and which is endwise located by a shoulder 18 (see Figure 3). The sleeve 15 serves as an axially located part of a tool-carrying spindle of which an axially movable part 19 has external splines 20 engaged by coacting internal teeth 21 of the sleeve.

The spindle part 19 is journalled, with axial location, in a cross-head 22 which is slidably guided by a substantially part-cylindrical wall 23 of the body, the wall 23 and cross-head being formed as indicated at 24 in Figure 7 to prevent relative rotation. The outer end of the wall 23 has a spigotal connection with a nose-piece 25 having a counter-bored recess to house a bearing 26 in which the outer end of the spindle part 19 can slide and turn. The bearing 26 is located by a cap 27 which is held, as by screws (not shown), to the nose-piece. As indicated in Figure 1, the outer end of the spindle part 19 can be provided with a chuck 28.

The sleeve 15 also drives, through a gear pair 29, 30, a gear pump 31 of which the intake pipe 32 communicates with the fluid 14 in the reservoir through a filter 33. The latter is suitably located by a removable drain plug 34 and is so disposed in the reservoir as to be submerged in the fluid 14 (assuming, of course, that there is an adequate quantity of the latter) no matter whether the unit be held with the spindle part 19 in the horizontal position shown or directed vertically upward or downward.

The pump 31 delivers, through ducts 35, 36, to an annular gallery which is defined between radial shoulders 37, 38 of the sleeve 15 and a bore 39 of the body, and the fluid then passes, through a port 40, into a main duct 41. The latter has lateral communications 42, 43 (see Figure 6) with movable control valve members presently to be described, and it has a constriction 44 through which it communicates with a second annular gallery, which is defined between radial shoulders 38, 45 of the sleeve 15 and the said bore 39, under the control of a valve member 46 of which the position can be adjusted by a member 47 having a screw-threaded engagement at 48 with the body and an external knob 49. The main duct 41 is also provided with a communication 50 with the reservoir 12 through a spring-biassed relief valve 51.

At each side of the spindle part 19 the cross-head 22 carries a piston 52 (shown provided with a cup washer 53) working in a corresponding bore of the body 11. These pistons are normally biassed to the position shown in Figure 3 by compression springs 54 which react between the adjacent faces of the nose-piece 25 and the cross-head, the springs being held aligned by internal fingers 55 which are fast with the nose-piece and extend into hollow interiors of the pistons.

Adjacent the head of each piston is a working space 56 which communicates through ducts 57 with the second-mentioned gallery (i. e., the one between the shoulders 38 and 45) whereby the fluid which passes the adjustable valve 46 is admitted behind the pistons 52.

The movable control valve member associated with the lateral communication 43 from the main duct 41 is shown at 58 in Figure 2, and it is slidable in a bore of the body 11, having a reduced end which passes freely through the cross-head 22 and carries, on the remote side of the cross-head, an abutment 59. The latter extends upwardly through a longitudinal slot 60 of the body, which slot prevents rotation of the control valve member 58 and gives access to a grub screw 61 by which the abutment is held to the valve member in a longitudinally adjustable manner. The valve member 58 has a waist 62 which, in the starting position of the unit shown in the drawings, permits the hydraulic fluid in the main duct to pass, through a non-constricted communication 63, to the said second annular gallery (i. e., between the shoulders 38, 45 of the sleeve 15) and thence through the ducts 57 to the working spaces 56.

There is a second control valve member, and this controls the lateral communication 42 from the main duct 41. The second control valve member is formed in two separate aligned portions 64, 65 working in bores in the body which are separated by a partition 66. The portion 64, like the control valve member 58, has a reduced end which passes freely through the cross-head 22 and carries an adjustable abutment 67 with a fixing screw which is accessible through a longitudinal slot 68 of the body. The other portion 65 of the second control valve member is normally held by a spring 69 to cover a communication 70 from the said second gallery round the sleeve 15.

In circumstances later to be described the cross-head engages the abutment 67 to move the part 64 for a transverse bore 71 therein to establish a communication from the main duct 41 to a duct 72, and the hydraulic fluid thus admitted to the duct 72 passes out of a lateral port 73 to act on a head 74 of the valve portion 65. This causes the latter to move against the spring 69 (i. e., towards the right of Figure 2) to bring a waist 75 of the portion 65 into a position to establish a communication between the lateral communication 42 and the communication 70, and the valve portion 65 is held in its displaced position by a cam device.

The cam device includes a plate 76 (see Figures 2 and 4) which is pivoted at 77 to the body, and has an arcuate slot 78 engaged under a head 79 of the valve member portion 65. The thickness of the plate 76 is greatest at the top end of the slot 78 (i. e., as regards Figure 4) and progressively diminishes towards the bottom, and a spring 80 urges the plate about its pivot to cause a part, of appropriate thickness, of the plate to be moved to hold the head 79 in its extended position, thus maintaining the waist 75 in registration with the communications 42 and 70. The plate 76 has fast with it an operating handle 81 by which it can be restored to the position shown in Figure 4, for enabling the spring 69 to re-set the valve member portion 65 to the position shown in Figure 2.

The various parts of the unit are shown in the positions they occupy at the commencement of an operation. With the electric motor running the spindle 19 is driven rotatively and so is the hydraulic pump. The delivery from the latter is to the main duct 41, and thence through two parallel paths to the said second gallery which is in permanent communication with the working spaces 56 behind the pistons 52. One of the parallel paths is the constricted one through the valve 46 and the other is the non-constricted one through the lateral communication 43, the waist 62 of the control valve member 58 and the communication 63. The pistons thus advance the cross-head 22, and the latter moves the spindle 19 to bring the tool it carries up to a work-piece (not shown). At this stage, the abutment 59 having been appropriately set, the cross-head operates the control valve member 58 to move its waist 62 out of registration with the communications 43 and 63, and the further forward movement of the spindle 19, for feeding the tool into the work-piece, is at the slower rate controlled by the setting of the valve 46 in the constricted path. A thrust bearing 87 transmits the thrust from the cross-head 22 to the spindle 19.

At the end of the tool feeding phase, the cross-head picks up the abutment 67 on the control valve member portion 64 (the position of which abutment will previously have been appropriately adjusted for the work in hand), and operates the portion 64 to divert some of the pressure fluid in the main duct to operate the other valve portion 65 in the manner above described. While this occurs the forward motion of the spindle 19 is arrested (so as to enable, for example, a drill in the chuck 28 to clear the bottom of a bore it has just made in the work-piece), and the movement of the valve portion 65 brings its waist 75 into registration with the lateral communication 42 and a part 82 leading to a passage 83 for by-passing the hydraulic fluid from the main duct 41 back to the reservoir 12. The waist 75 is also then in registration with the communication 70 and the passage 83, and the pistons 52, being relieved of hydraulic pressure, are returned by their springs 54 to their initial positions (the cross-head acting on shoulders, at the junctions of the control valve members 58 and 64 and their respective reduced ends, to restore the said members 58 and 64) and express the hydraulic fluid behind them back into the reservoir. During this return movement the valve member portion 65 is held in position by the plate 76. For restarting the cycle of operations just described, it is only necessary to move the plate (using the handle 81) to allow the valve member portion 65 to cut off the by-pass and return paths, the fluid in the space between the portion 65 and the partition 66 returning through a duct 84 in the valve member 64 to exhaust.

The body is provided with a foot 184 by which the unit can be set up on a work table, and the reservoir is provided with two interchangeable plugs 85, 86 of which one closes a filling opening, through which hydraulic fluid can be poured into the reservoir, and the other has a bore so that it can act as a breather, the plugs being changed in position according as to whether the unit is mounted with the spindle vertical or horizontal.

By suitably arranging two or more of the units above described on a work table, each unit being adapted to perform a different operation on a work-piece, it can be arranged for one of the units, at the completion of its operation, to start another of the units for the carrying out of a further operation. Thus it could be arranged for, say, the cross-head of the first-mentioned unit when recovered to its initial position to move, through a suitable linkage or other means, the plate 76 of the next unit into the starting position. In this way a group of the units could be arranged automatically to carry out a series of operations on the work-piece in sequence.

What I claim as my invention and desire to secure by Letters Patent of the United States is:

1. A machine tool comprising a driven shaft, a hydraulic pump and a tool spindle connected to be driven from said shaft, said tool spindle axially slidable with respect to said shaft, a hydraulic cylinder connected to receive the pump delivery, a coacting hydraulic piston rotatively supporting said tool spindle with relative axial location, said piston biased in opposition to the effort in said cylinder of said pump delivery, a valve means for actuation by a part moving with said piston when the latter is in an intermediate position for diverting a proportion of the pump delivery from said cylinder whereby the further travel of said piston will be at a reduced speed, a second valve means for actuation by a part moving with said piston when the latter has reached the end of its outward travel, a time delay means actuated by the opening of said second valve means for connecting said cylinder to exhaust and for diverting the remainder of the pump delivery from said cylinder, said piston then being returned by its bias to restore the two valve means in readiness for a subsequent actuation, and a detent means for holding said piston when it resumes its initial position.

2. A machine tool comprising a driven shaft, a hydraulic pump and a tool spindle connected to be driven from said shaft, said tool spindle axially slidable with respect to said shaft, two hydraulic cylinders connected to receive the pump delivery and arranged at opposite sides of said tool spindle, two coacting hydraulic pistons rotatively supporting said tool spindle with relative axial location, said pistons biased in opposition to the effort in said cylinders of said pump delivery, a valve means for actuation by a part moving with said pistons when both of the latter are in an intermediate position for diverting a proportion of the pump delivery from both said cylinders whereby the further travel of both said pistons will be at a reduced speed, a second valve means for actuation by a part moving with said pistons when both the latter have reached the end of their outward travel, a time delay means actuated by the opening of said second valve means for connecting both said cylinders to exhaust and for diverting the remainder of the pump delivery from both said cylinders, said pistons then being returned by their biasses to restore the two valve means in readiness for a subsequent actuation, and a detent means for holding said pistons when the latter resume their initial positions.

3. A machine tool comprising a driven shaft, a hydraulic pump and a tool spindle connected to be driven from said shaft, said tool spindle formed in two relatively nonrotatable parts of which one is axially located and fast with said driven shaft and of which the other spindle part is axially slidable relatively to the spindle part first mentioned, two hydraulic cylinders connected to receive the pump delivery and arranged at opposite sides of said tool spindle, two coacting hydraulic pistons, a cross-head interconnecting said pistons and rotatively supporting said slidable spindle part with relative axial location, said pistons biased in opposition to the effort in said cylinders of said pump delivery, a movable valve member of which a stem extends slidably through a hole in said cross-head, a stop on said stem for engagement by said cross-head when said pistons are in an intermediate position so as to actuate said movable valve member for diverting a proportion of the pump delivery from said cylinders whereby the further travel of said pistons will be at a reduced speed, a second movable valve member of which a stem extends slidably through another hole in said cross-head, a stop on said stem for engagement by said cross-head when said pistons have reached the end of their outward travel whereby to actuate said second movable valve member to deliver hydraulic fluid to actuate a time delay means, said time delay means when actuated connecting said cylinders to exhaust and diverting the remainder of the pump delivery from said cylinders, said pistons and cross-head then being returned by the piston biasses to restore the two movable valve members to their initial positions in readiness for a subsequent actuation, and a detent means for holding said second movable valve member against a bias in its initial position whereby to maintain said slidable spindle part retracted in readiness for a subsequent operation.

4. A machine tool, according to claim 3, of which the first-mentioned movable valve member is actuated by said cross-head to close one of two parallel paths through which the hydraulic fluid had been fed for moving the pistons at the faster rate, there being a relief valve through which the fluid denied passage through the closed path passes to a reservoir from which the pump is supplied.

5. A machine tool, according to claim 3, of which the time delay means includes a piston type valve which is operated, when said second movable valve member is actuated, to by-pass the pump delivery to a reservoir from which said pump is supplied and to connect the working spaces of said cylinders to said reservoir.

HERBERT DALES.

REFERENCES CITED

The following references are of record in the file of this patent:

UNITED STATES PATENTS

| Number | Name | Date |
| --- | --- | --- |
| 1,582,468 | Heald et al. | Apr. 27, 1926 |
| 1,877,102 | Whitesell | Sept. 13, 1932 |
| 2,192,778 | Stacy | Mar. 5, 1940 |
| 2,245,080 | Pendleton | June 19, 1941 |
| 2,550,148 | Harding | Apr. 24, 1951 |